(12) United States Patent
Iga

(10) Patent No.: US 6,351,264 B1
(45) Date of Patent: Feb. 26, 2002

(54) METHOD FOR COMPUTER IMAGE COLOR SHADING PAINTING OR RECREATION

(76) Inventor: Adam S. Iga, P. O. Box 2917, Kampala (UG)

( * ) Notice: Subject to any disclaimer, the term of this patent is extended or adjusted under 35 U.S.C. 154(b) by 0 days.

(21) Appl. No.: 09/080,951

(22) Filed: May 19, 1998

Related U.S. Application Data

(60) Provisional application No. 60/047,183, filed on May 20, 1997.

(51) Int. Cl.[7] .......................... G06F 15/00; G06T 15/50
(52) U.S. Cl. ........................ 345/431; 345/433; 345/339
(58) Field of Search .................................. 345/431, 433, 345/434, 118, 121, 113, 114, 150, 152, 339, 342, 349, 145, 157, 163, 513, 197; 395/2, 131, 143; 364/521; 358/81, 82; H04N 1/46

(56) References Cited

U.S. PATENT DOCUMENTS

| | | | | |
|---|---|---|---|---|
| 4,878,178 A | * | 10/1989 | Takakuru | 364/521 |
| 5,093,717 A | * | 3/1992 | Sandrew | 358/81 |
| 5,469,536 A | * | 11/1995 | Blank | 345/431 |
| 5,600,446 A | * | 2/1997 | Iga | 386/117 |
| 5,611,036 A | * | 3/1997 | Berend | 345/441 |
| 5,920,694 A | * | 7/1999 | Carleton | 345/331 |

FOREIGN PATENT DOCUMENTS

| | | | | |
|---|---|---|---|---|
| WO | 99/49400 | * | 9/1999 | G06F/17/30 |

* cited by examiner

*Primary Examiner*—Matthew Luu
*Assistant Examiner*—Wesner Sajous
(74) *Attorney, Agent, or Firm*—Venable; Clifton E. McCann

(57) ABSTRACT

A method for video image color shading and recreation uses already compressed video data so that another video compression scheme is not further needed to compress the final shaded or recreated image to fit a specific storage medium.

7 Claims, 8 Drawing Sheets

CHOOSE A COMPUTER DISPLAY SCREEN IMAGE MAP COMPOSED OF AN EQUAL NUMBER OF PARTITIONS IN THE X-Y PLANE OF THE DISPLAY SCREEN IN SUCH A WAY THAT EACH SUCH PARTITION ENCLOSES A SPECIFIC NUMBER OF FIELD LINE PARTS EQUAL THROUGHOUT EACH PARTITION AND EACH OF SAID SPECIFIC NUMBER OF FIELD LINE PARTS HAVING A SPECIFIC NUMBER OF PIXELS THAT ARE THE SAME ON EACH OF THE FIELD LINE PARTS THROUGHOUT THE ENTIRE DISPLAY SCREEN MAP

↓

GENERATE A FIELD LINE PART IMAGE DATA CODE BY USING PRIMARY COLORS OF RED, GREEN AND BLUE OF THE DISPLAY SCREEN RAISED TO THE POWER OF THE TOTAL NUMBER OF PIXELS ON A FIELD LINE PART OF SAID COMPUTER DISPLAY SCREEN IMAGE MAP, SO THAT THE DIFFERENT OR UNIQUE COMBINATIONS OF HOW THE TOTAL NUMBER OF PIXELS ON A FIELD LINE PART OF SAID COMPUTER DISPLAY SCREEN IMAGE MAP IS EXACTLY EQUAL TO BASE THREE RAISED TO THE POWER OF THE TOTAL NUMBER OF PIXELS ON THE FIELD LINE PART;

↓

CONVERT THE BASE THREE RAISED TO THE TOTAL NUMBER OF PIXELS ON THE FIELD LINE PART FIGURE TO BASE TWO OR BINARY NOTATION

↓

STORE THE UNIQUE COMBINATIONS IN BINARY NOTATION THAT REPRESENT ALL POSSIBLE ARRANGEMENTS OF THE TOTAL NUMBER OF PIXELS ON A FIELD LINE PART BASED ON THE THREE PRIMARY COLORS OF RED, GREEN AND BLUE

↓

USE A COMPUTER SHADING OR PAINTING OR IMAGE RECREATION TOOL SUCH AS A COMPUTER PAINTING BRUSH, A KEYBOARD OR A COMPUTER MOUSE TO SHADE, PAINT OR RECREATE AN IMAGE, AND STORING THE COMPUTER CODE GENERATED AS THE COMPUTER SHADING, PAINTING OR IMAGE RECREATION TOOL DOES THE PAINTING, SHADING OR RECREATION

↓

FETCH A COPY OF THE COMPUTER CODES GENERATED BY THE SHADING, PAINTING OR RECREATION TOOL FROM THE STORAGE MEDIUM ON A FIELD LINE PART BY FIELD LINE PART BASIS AND MATCHING THEM TO SAID UNIQUE COMBINATIONS IN BINARY NOTATION THAT REPRESENT ALL POSSIBLE ARRANGEMENTS OF THE TOTAL NUMBER OF PIXELS ON THE FIELD LINE PART OF SAID COMPUTER DISPLAY SCREEN MAP

↓

STORE SAID MATCHED FIELD LINE PART IMAGE DATA CODES THAT NOW REPRESENT THE PAINTED, SHADED OR RECREATED IMAGE IN A SUITABLE COMPUTER DATA STORAGE MEDIUM SUCH AS PERMANENT MEMORY FOR TRANSMISSION TO A COMPUTER TERMINAL OR FOR VIEWING ON A DISPLAY SCREEN OF SAID COMPUTER.

FIG. 8

METHOD FOR COMPUTER IMAGE COLOR SHADING PAINTING OR RECREATION

CROSS REFERENCE TO RELATED APPLICATION

This application claims the benefit of Provisional application No. 60/047,183 filed May 20, 1997, Improved Method for Computer Image Color Shading Painting or Recreation.

FIELD OF THE INVENTION

The present invention relates generally to computer image formation and more particularly to computer image shading and recreation.

BACKGROUND OF THE INVENTION

A plurality of methods for image formation with regard to image color shading and recreation exist. One such method described in U.S. Pat. No. 5,600,446 in the names of the present applicant specifically uses a keyboard and display screen of a video camera to recreate or shade an original image using one or more pre-determined image frame parts to alter, shade or recreate such an original image so that a final composite shaded or recreated image is produced.

This method however is limited for use only in a video camera of pre-determined construction. Other methods such as that of the Adobe Photoshop software routine that use a computer method of using a computer painting brush or a computer mouse to shade an image also exists. This method though excellent uses non-compressed video data thereby creating a problem where to store the final shaded or recreated images. Since computer storage space is at a premium, especially that one for storing computer video, an improved method that uses a compressed video algorithm to shade or recreate a new composite image by color shading of a given image is therefore needed. This makes the need for use of a compression scheme to compress the final composite recreated or shaded image unnecessary. A typical situation of this nature arises for example when preparing a video clip for a web page on the world-wide web (the Internet). After choosing an original video clip, some image recreation such as shading is needed for the video clip to suit what is being advertised on the web. This may also involve video clip editing etc, etc. Such software for color image shading works better for its money in the place of very expensive hardware—only based solutions.

After the image recreation is done, then image compression is needed to reduce storage space for the video clip.

A video compression scheme is therefore needed to compress the final composite recreated or shaded video clip. The method used by such methods as the Adobe photoshop software are therefore inefficient and further improvements are accordingly needed.

In the U.S. patent application titled "Improvement in moving video image compression, decompression and transmission" filed on Apr. 8, 1997 in the names of the present applicant, therein is described in detail a method for generating a video image compression algorithm and then using the generated video compression data generated using said algorithm to transmit the video images using the software routine described therein.

The present invention will use video compression code generated according to the algorithm mentioned in the above application of Apr. 8, 1997 to effect color image shading and recreation.

SUMMARY OF THE INVENTION

It is therefore the primary object of the present invention to provide an improved method for video image color shading and recreation using already compressed video data so that another video compression scheme is not needed to compress the final shaded or recreated image to fit a specific storage medium.

Another object of the present invention is to provide an improved method for computer video color image shading and recreation using a cursor and keyboard or a computer mouse.

Other objects and advantages of my invention will become apparent to those well versed in this art from the following detailed description of the preferred embodiment and the accompanying drawings.

BRIEF DESCRIPTION OF THE DRAWINGS

The drawing in FIG. 1 shows a display screen of a computer or a TV (television). The dotted lines numbered 5, 6, 7, 8 and 9 are the first field lines of 262.5 lines and the non-dotted lines 1, 2, 3 and 4 are the second field lines of 265.5 lines for a total of 525 lines of information, with the two fields being interlaced in the case of the NTSC television system.

Suffice to mention here that each such field line in a 480 by 640 computer display monitor has 640 pixels on each of the 480 field lines.

Figure 2:
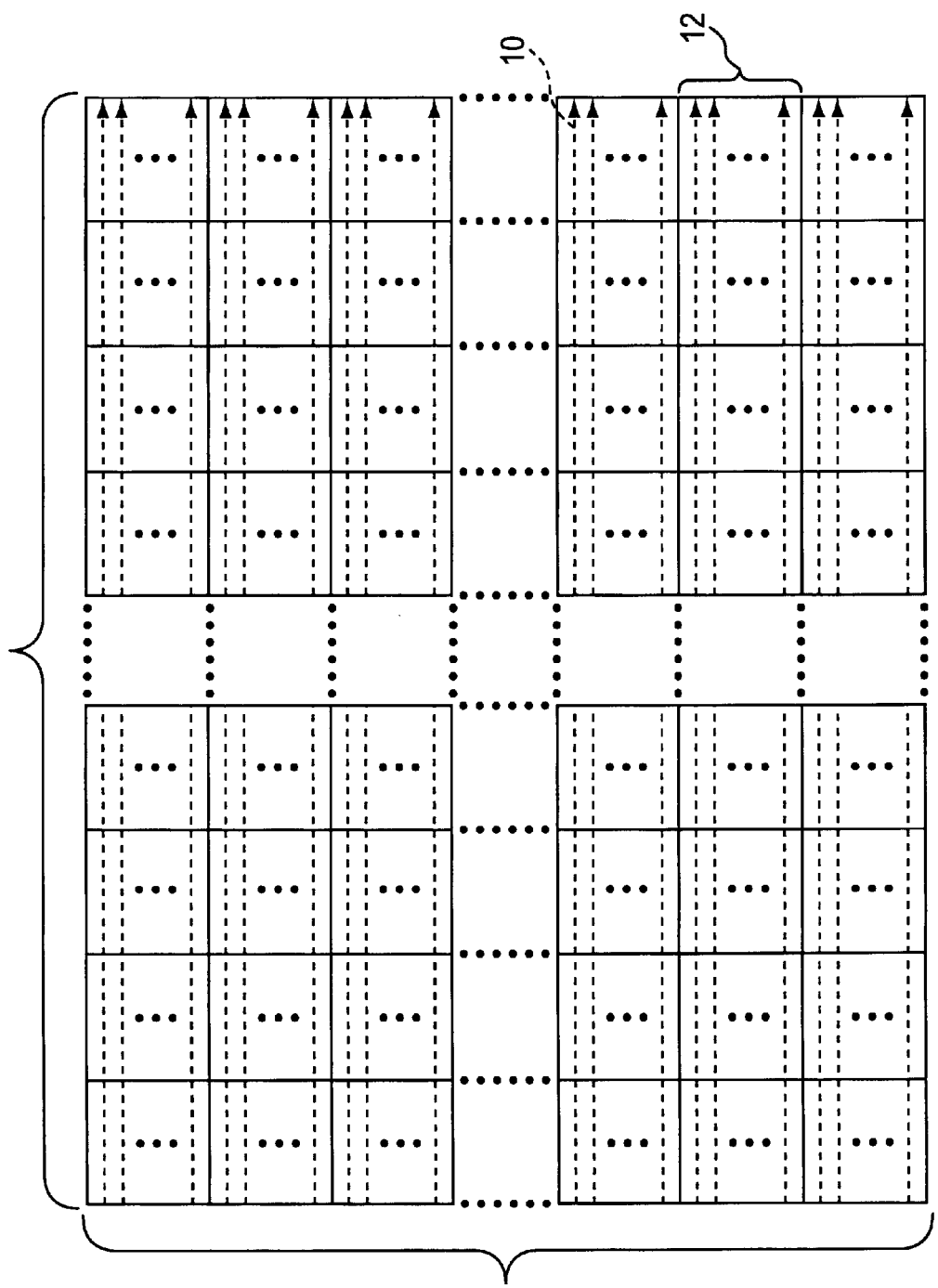

The drawing in FIG. 2 is a display screen (480×640) divided into 32 rows of coordinate points and 32 columns of coordinate points for a total of 1024 total coordinate points comprising an image frame with 10 showing a specific field line and 12 showing a coordinate point. This image display plan or map will be used as an example given to explain the entire invention, although other coordinate points plans can be used equally effectively.

Figure 3:
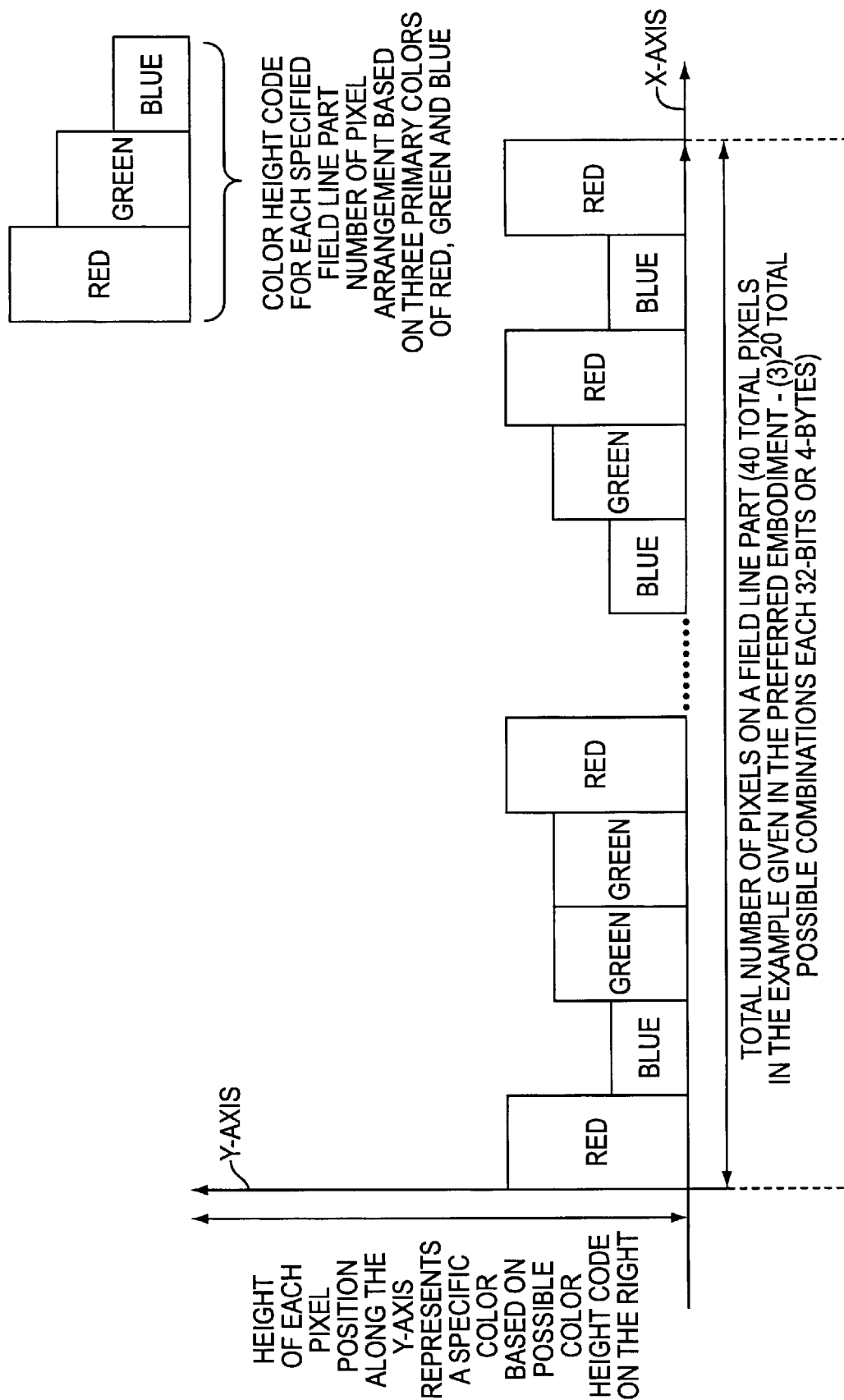

The drawing in FIG. 3 shows how video compression code is generated with regard to a field line part in each coordinate point, said field line part comprising 20 pixels on every field line part.

Figure 4:
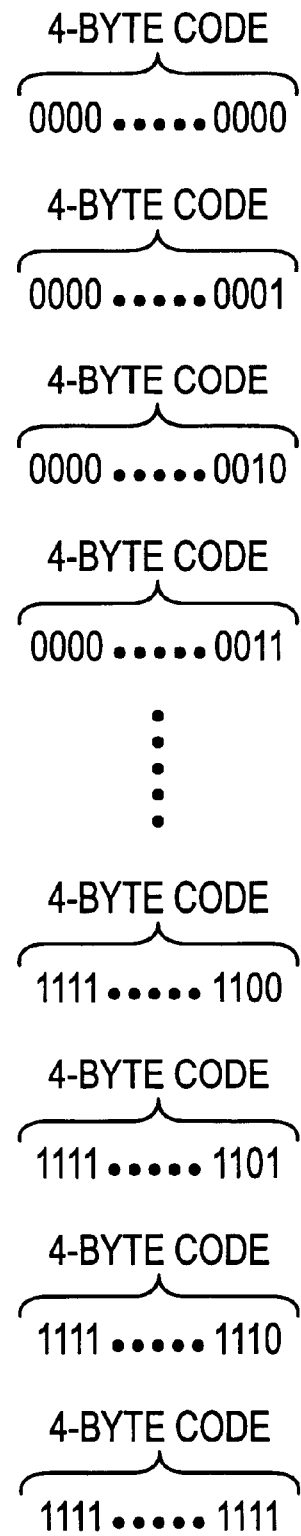

The drawing in FIG. 4 is the compression code generated for the three primary colors of Red, Green and Blue raised to the power of the total number of pixels on a field line part which is 20 in this example.

Hence there are $(3)^{20}$ $(2^1 \times 2^{3/5})^{20}$ $=(2^{20} \times 2^{12})=2^{32}$ total different (unique) combinations of how the twenty pixels on each field line part can be arranged in the primary colors of red, green and blue, with each such unique combination having 32-bits or 4- bytes.

Figure 5:
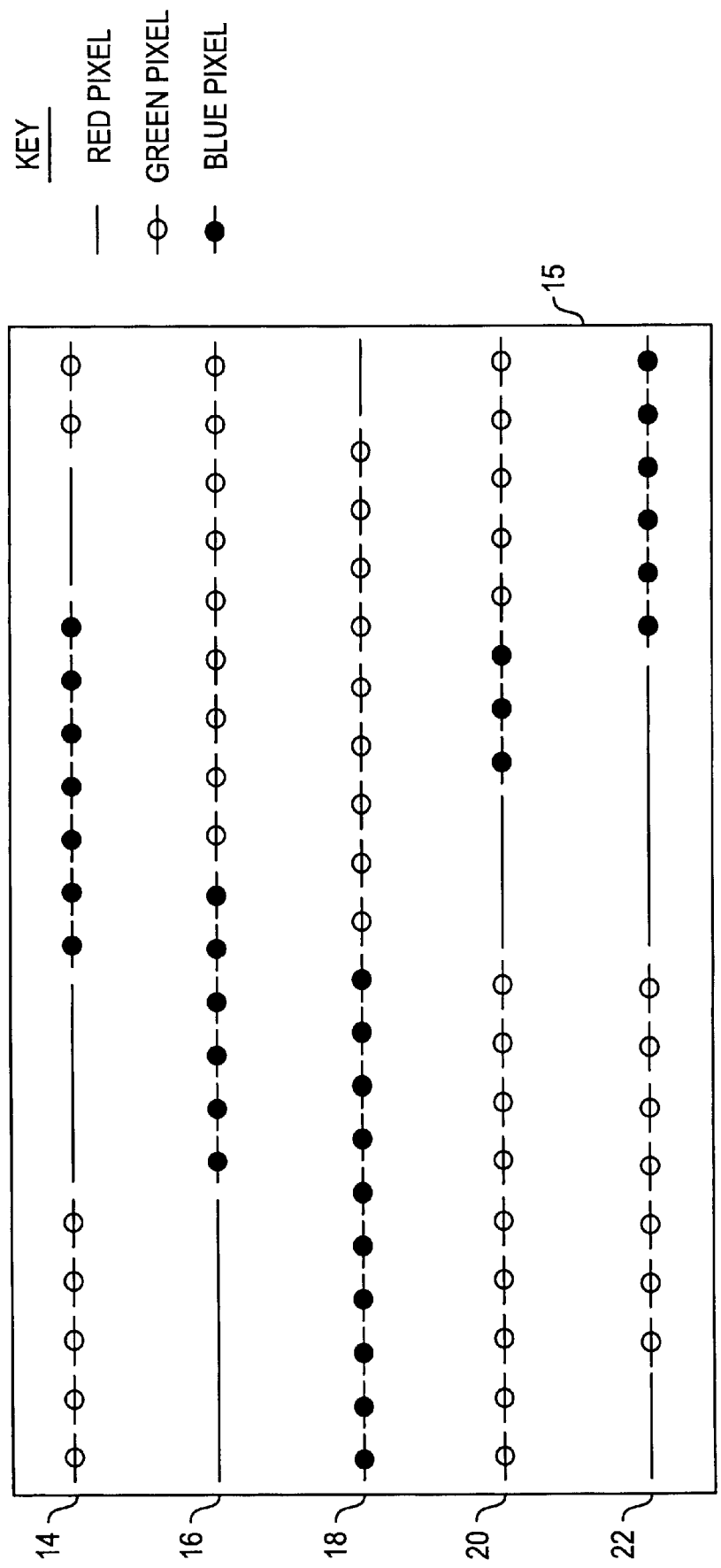

The drawing in FIG. 5 and the accompanying color key shows how field line parts shaded or painted or altered as shown in the colors of red, green and blue can easily be coded. As the shading or color painting progresses using either a cursor or keyboard, a computer mouse or computer painting brush, the combination of colors made on each group of 20 pixels contained on a field line part is unique and is given one of the 32-bit (4-bytes) code generated in FIG. 4. This special 32-bit code is than stored in the display input and output registers for further processing by the microprocessor of the computer terminal. As an example, field line part 14 in FIG. 5 has the first 5 pixels shaded or painted green, using a cursor and keyboard, a computer mouse or a computer painting brush, the next 4 pixels are shaded or painted red, the next 7 pixels are shaded or painted blue, the next 2 pixels are shaded or painted red and the last 2 pixels are painted or shaded green to complete the shading or painting of the entire field line part comprising 20 pixels.

In similar fashion, field line part 16 of FIG. 5 has the first 5 pixels painted or shaded red, the next 6 pixels shaded or painted blue, the next 9 pixels painted green for a total of 20 pixels on the field line part for a display screen map or plan of 32 rows and 32 columns used herein as an example to describe the preferred embodiment in detail.

Figure 6:
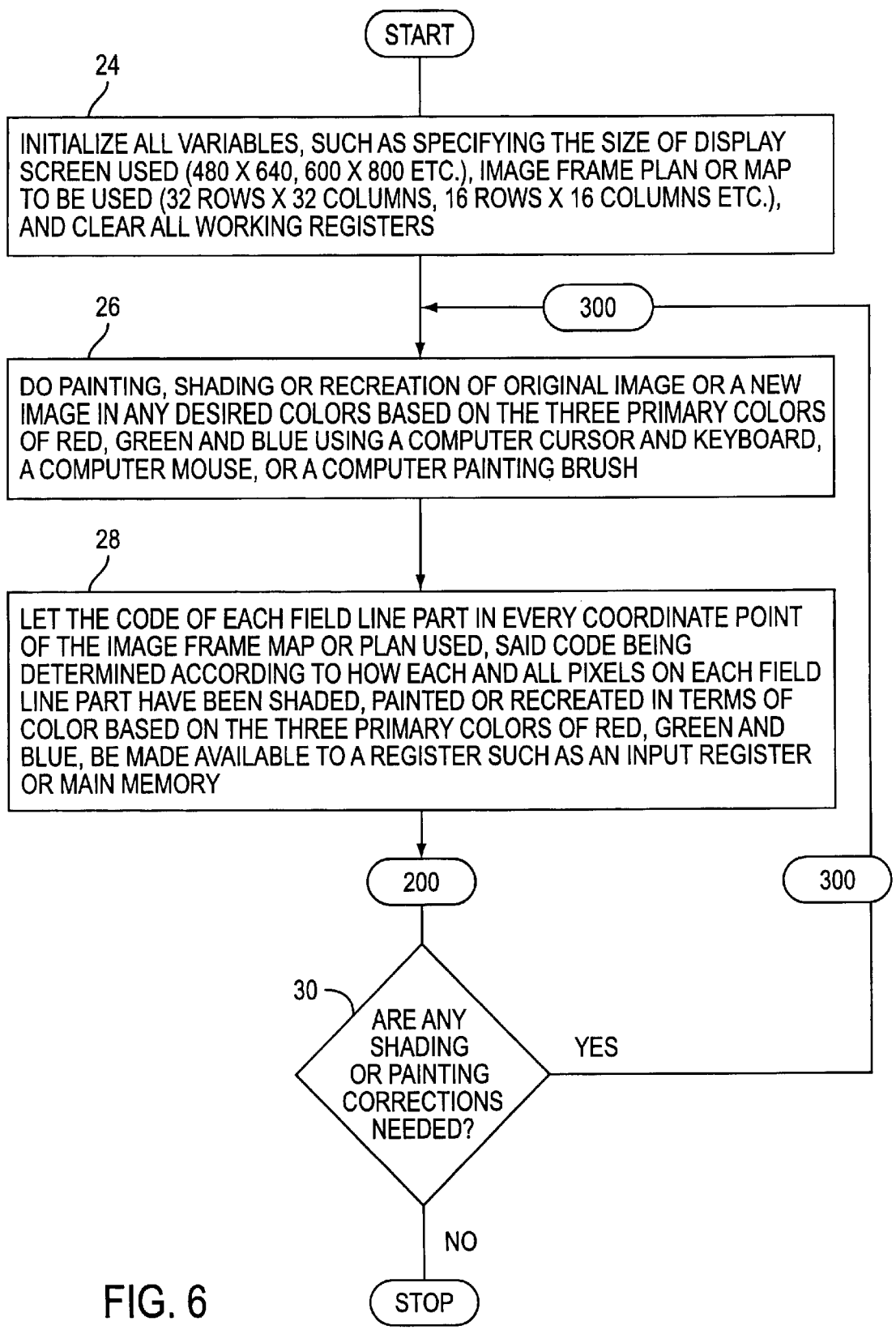

FIG. 6 is a flow chart software routine of how the shading is done. In step 24, initialisation is done. This involves clearing working registeres (storage), and the setting of variable parameters such as specifying the display screen map or plan to be used. The chosen display screen map automatically specifies how many pixels on each field line part and therefore a total of $(2)^{32}$ unique code combinations each 32-bit in length are generated accordingly, and stored in working memory or main memory for easy access by the microprocessor. Also the size of the display screen is chosen as a variable parameter. The $(2)^{32}$ unique combinations are based on a 480×640 display screen size which is currently the most common in computer display screens. However, TV's and other computers have different size screens such as the NTSC system with 525 field lines interlaced or the 600×800 display screen size. The $(2)^{32}$ unique code combinations are generated according to the method of FIG. 3.

In step 26, the actual shading or painting is done using either a cursor and keyboard, a computer mouse or a computer painting brush, and in step 28, as the shading profresses, each code representing the colors of all the 20 pixels on a field line part is recorded in an import register or memory storage, field line part by field line part until the entire field line is coded and temporarily stored.

In steps 30 and 32, the software routine checks to see if all shading is done and if so are there any shading corrections to be made? If the answer is yes, to step 30, then the shading or painting routine is complete. If not then step 32 is done (any needed shading corrections are made) via route 300, back to step 26 and the entire process is repeated. If no shading corrections are needed then the shading or painting routine is completed. The software routines in FIG. 6 are the steps taken by the user of the computer software.

Figure 7:
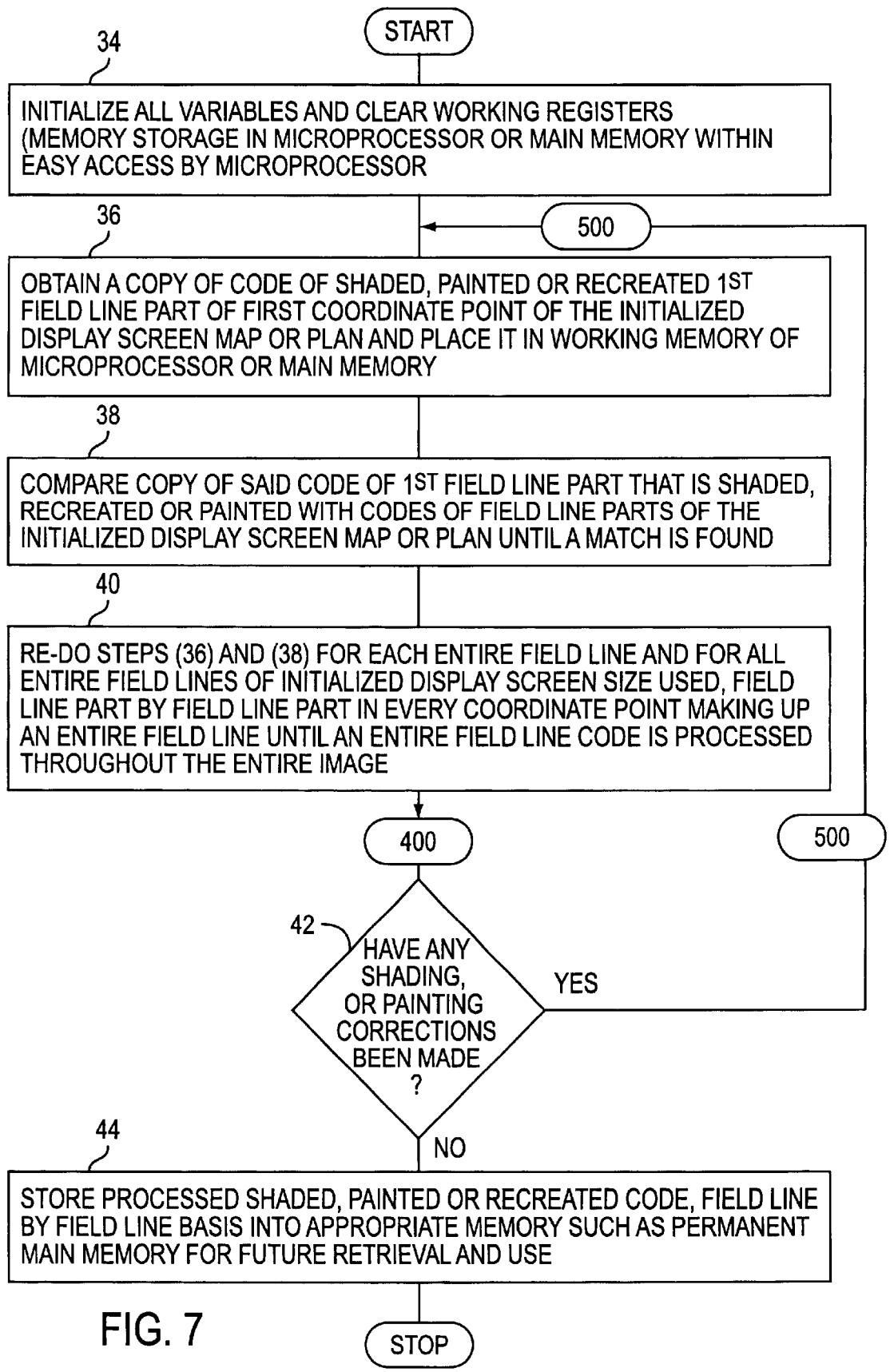

The drawing in FIG. 7 is the software routine that the microprocessor of the computer uses to process the video data generated by the shading or painting by the image.

In step 34, all variables are set; such variables or parameters such obtaining the $(3)^{20}$ total unique codes that are dependent on the display screen map used. In this specific example, a 32 row by 32 column display screen map is used to provide $(3)^{20}$ unique codes exactly each code having 32-bits in length, since $(3)^{30}$ is approximately equal to $(2)^{32}$.

A copy of the shaded or painted code of first field line part is obtained from the input register into the microprocess register and compared with the display screen map code to find a match. This comparison is done field line part by field line part for the entire field line and for all field lines that make up the entire image that has been shaded.

In otherwords, the software flow chart routine of FIG. 7, is the microprocessor response to the computer user software flow chart routine of FIG. 6. For example, by carrying out the utilization process in step 24 of FIG. 6, the microprocessor among other things generates the compressed field line part code of FIG. 4, depending on the image frame map or plan used. The compressed field line part code of FIG. 4 is specifically for the 32 row by 32 column image frame map or plan. This process is carried out by the microprocessor in step 34 of FIG. 7.

Again in response to the user steps 26 and 28 of FIG. 6, of doing the actual image shading or painting the microprocessor, in steps 36 of FIG. 7, obtains a copy of the shaded or painted fieldline part image data code from the input/output registers and places it in its working memory or main memory for fast access, then in step 38 uses the image frame plan or map image data code generated in step 24 above to compare the shaded or painted image data code with the generated code.

FIG. 8 is a flow diagram of the steps of the invention.

DETAILED DESCRIPTION OF THE PREFERRED EMBODIMENT

Figure 1:
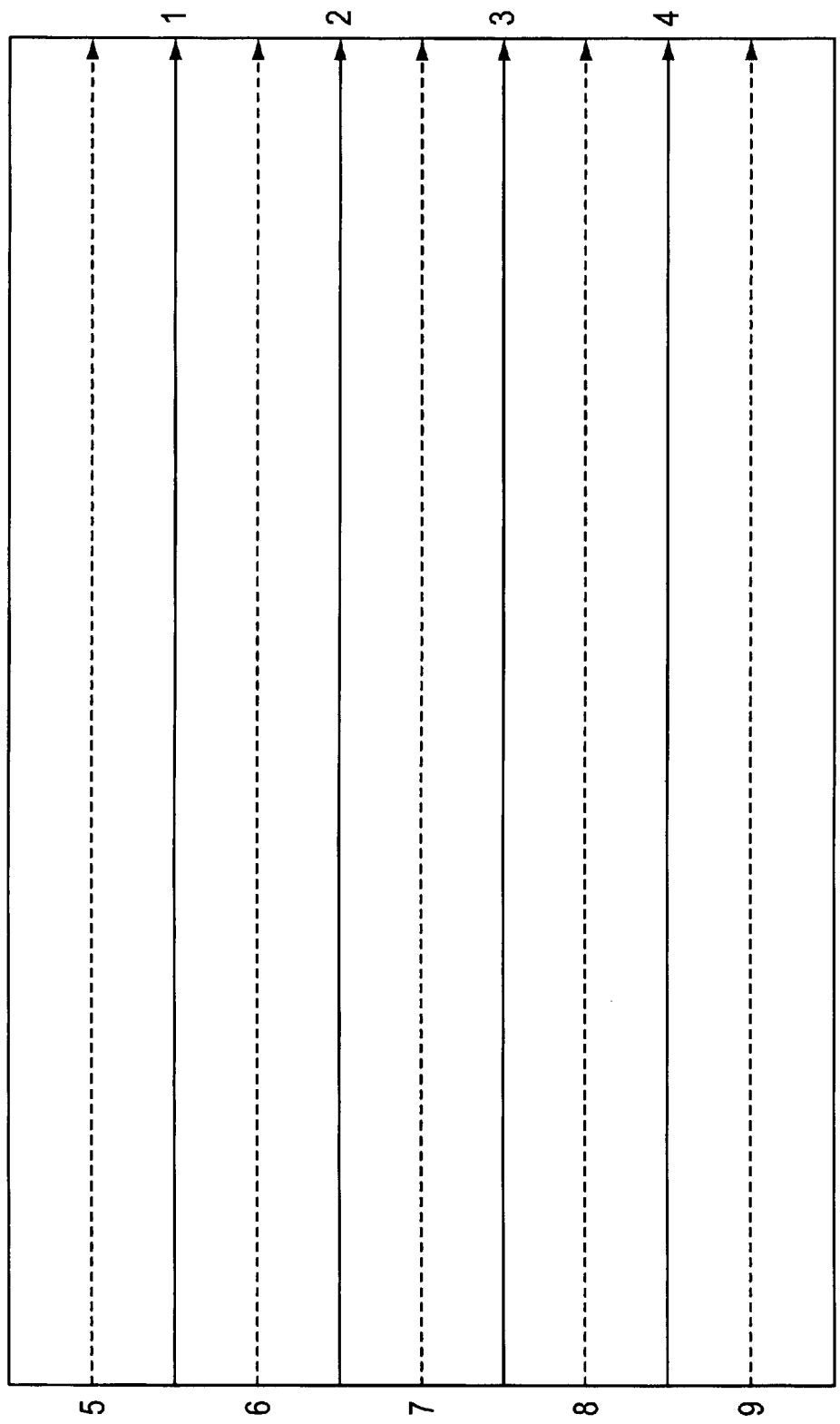

Now referring to FIG. 1, a computer or television display screen in order to display an image is normally composed of a specific number of field lines. These field lines which may be grouped into two interlaced fields for example of 265.5 lines each with regard to the NTSC television system, with lines 1,2 3 and 4 showing the first field and lines 5, 6, 7, 8 and 9 showing lines of the second field.

Alternatively, most modem computer display screens have 480 field lines from top to bottom of the screen with each field line having 640 pixels.

With specific reference to the preferred embodiment of this invention, such a 480×640 computer display screen is shown in the drawing in FIG. 2 divided into 32 equal rows and 32 equal columns of partitions in the X-Y plane referred to throughout this invention description as coordinate points. The 32 rows by 32 column division is called an image frame plan or map. Other image frame plans such as a 32 rows by 16 column, a 16 rows by 16 columns, etc, etc may be used. However, the 32 rows by 32 column image frame plan will be used as a specific example throughout the description of this embodiment.

With such an image frame map as shown in FIG. 2, each image is divided into 1024 coordinate points in the X-Y plan and all equal in area. Each single coordinate point has 15 field line parts with each field line part having 20 pixels.

Image data is generated according to FIG. 3 by lining up the 20 pixels on the field line part and finding how many different ways they can be arranged in the three primary colors of red, green and blue. This gives a total of $(3)^{20}$ (base three raised to the power of twenty).

In order to get all the $(3)^{20}$ different combinations noted, we need approximately $(3)^{20}=(2^1 \times 2^{3/5})^{20}=(2^{20} \times 2^{12})=2^{32}$ combinations. So each of the $(3)^{20}$ different combinations require 32 bits or is 32-bits in length.

Normally, in 24-bit true color, each pixel color and brightness is represented by a 24-bit code. So 20 pixels would be represented by 480 bits or 60-bytes. However, with the method of this invention only 32-bits or 4-bytes are required to represent the 20 pixels. This gives a compression ratio of 480 to 32 or 15 to 1 (15:1) over non-compressed video.

Once compressed image data is generated according to FIG. 3, and FIG. 4, then the shading, painting or image recreation proceeds as shown in the flow chart software routine of FIG. 6. FIG. 5 is given here as an example. Field line part 14 has the first 5 pixels painted or shaded green with a given average brightness that is chosen or calculated for all colors to be shaded or painted. The next 4 pixels are painted or shaded red, while the next 7 pixels are shaded or painted blue. The next 2 pixel points are painted red and the last 2 pixel points of field line part 14 of FIG. 5 are shaded green for a total of 20 pixels on each field line part.

As the shading or painting of all the 20 pixels of field line part 14 of FIG. 5 progresses one of the base three raised to the power of 20, $(3)^{20}$ unique code combinations is formed and temporarily stored in a suitable storage area such as an input register or an allocated area in main memory where the microprocessor can have fast access to it. So the color pattern of the 20 pixels of field line part 14 represents a unique 32-bit image code for 20 pixels. Likewise, the shading or painting of the pixel color pattern of the 20 pixel of field line part 16 of FIG. 5 is a unique 32-bit code of one of the $(3)^{20}$ total unique combinations, so is the color pattern of field line parts 18, 20 and 22.

Depending on what the user is shading or painting, the same color pattern may be allocated to more than one field line part. In fact the entire image data may belong to just one color pattern or one 32-bit code, so that all the 15360 field line parts contained in the 1024 coordinate points are described by just one 32-bit code image data. As mentioned previously however, at the other extreme end, each one of the 15360 field line parts may be represented by a different (unique) 32-bit code image data, out of the total possible $(3)^{30}$ 32-bit image data codes from which to choose from to describe any image available according to the image frame plan used.

Now, having described the software architecture needed to shade or paint an old or a new image according to the preferred embodiment of this invention, a possible flow chart software routine that the user may follow to effect the actual shading or color painting of any image is described with specific reference to FIG. 6 and FIG. 7. The routine of FIG. 6 is input into the computer by the user or operator using suitable shading or painting means such as a computer painting brush, a computer mouse or a computer cursor and keyboard, singly or in combination as the specific computer hardware used may demand.

In step 24 of FIG. 6, the initialization is done. This involves clearing working storage areas and setting variable parameters such as the image frame plan used (32 rows by 32 columns) and the size of the display screen (480 rows by 640 pixels or 600 rows by 800 pixels) depending on the size of the display screen being used.

During the initialisation process of step 24 of FIG. 6, depending on the image plan used, all possible $(3)^{20}$ unique codes of 32-bites each as shown in FIG. 4 for a 32 row by 32 column image map are generated and stored in a suitable working storage space such as a microprocessor cache memory, registers or main memory.

The initialization step 24 of FIG. 6 further standardises the field line parts image data code to be generated by the hand-aided computer painting brush, computer mouse and cursor or computer keyboard and cursor so that such field line parts code conforms or is compatible with the field line parts image data code generated according to the image map or plan chosen, which is 32-binary bit code for the 32-row by 32-column image plan or map.

In response to user actions of step 24 of FIG. 6, the microprocessor in step 34 of FIG. 7 clears space in working memory and generates the $(3)^{20}$ unique codes of compressed image data based the 20 pixels per field line part, 32 rows by 32 columns image map or plan, with each unique code having 32-bits.

In step 26, the user does the color shading or painting or image recreation of a new or lateration of an old image using a computer painting brush, a cursor and keyboard or a computer mouse.

As the painting or shading progresses, with each completed field line part, the 32-bit code generated by the painting or shading process specifically describes the color and average brightness of each of the 20 pixels on the completed field line part.

Similarly, image data codes for all shaded or painted field line parts that describe each of their respective 20 pixels in terms of color and average brightness are generated.

With regard to the average brightness of the colors of an image, and as described in the U.S. patent application of Apr. 8, 1997 (Patent application not yet provided) in the names of the present applicant, several average brightness values for this embodiment may be chosen and only one at a time may be used for each image or clip of images being shaded or painted depending on the wishes of the human or other means doing the painting, shading or image recreation.

As the painting, shading or image recreation of a new or alteration of an old image progresses the 32-bit compressed image data codes for each field line part completed are stored in the input registers or main memory within easy and fast access by the microprocessor.

This is done in step 28 of FIG. 6

In response to this compressed field line parts image data code input, the microprocessor in step 36 of FIG. 7 fetches copies of these codes from the input registers or specially designated main memory area into its working registers. Copies of these codes may also be fetched into the on chip cache of the microprocessor. Since most modern microprocessors nowadays have on—chip cache memory storage.

In step 38, copies of the fetched compressed image data codes, field line part code by field line part code for each of the 480 field lines making up the entire display screen are compared with the generated compressed field line parts image data code, generated by the microprocessor when the image display screen map or plan is chosen as a variable parameter in step 24 of FIG. 6. However step 38 of FIG. 17 indicates the routine of processing only one image data code of the field line part that was shaded, painted or recreated first.

In step 30 of FIG. 6, the operator may want to make any corrections to the shading or painting already done. If shading or painting corrections are needed, then via route 300 of FIG. 6, the software routine returns to step 26 and shading or painting corrections are done. Step 28 is taken, so is 30 until all the shading or painting corrections are made.

In step 40 of FIG. 7, the 2nd, 3rd, 4th up to the 480th field line compressed image data codes that are already shaded or painted are processed in like manner as the first field line.

In step 42, any needed shading corrections are forwarded via route 500 and steps 38, 38 and 40 are redone again. In step 44, the processed data of the entire image that has already been shaded, painted or recreated is stored in a suitable storage medium such as on soft or hard disk or in some other main memory type available.

This invention has now been fully described with respect to the particular embodiment.

Other slightly different embodiments especially with regard to the size of the display screen, the image frame plan or map chosen, the steps in FIGS. 6 and 7 used by the operator and microprocessor to shade or paint an original or a new image may be slightly different. However, they should all fall within the limits of the shading or painting method described herein.

What is most important, unlike other image shading and painting methods for Computer image processing, is that the method described herein uses compressed image data to do the painting or shading. This reduces the storage space needed to store the complete shaded or painted image. A shaded or painted image data according to this method is reduced in amount by a ratio of 15 to 1 over other methods as a still image. When used to shade or paint moving video data this method reduces such data by a maximum of 256 to 1 over non-compressed painted or shaded image data.

The method described herein while carrying out image shading or painting using compressed data does nor reduce the image quality of such painted images as other video compression schemes do by removing redundant image information thereby reducing the image quality. The method described herein uses compressed image data to shade or paint an image by grouping a number of pixels on a given partition of a field line and then finding how many different ways such a group of pixels can be arranged based on the three primary colors of red, green and blue. Accordingly the picture quality remains high despite the compressed data. The invention should therefore be determined not by the embodiment described herein only but by the appended claims and their legal equivalent.

What I claim is:

1. A computer method for painting, shading or recreating a new or an original image using image compressed data comprising the steps of:

(a) choosing a computer display screen image map, said computer display screen image map being composed of an equal number of partitions in the X-Y plane of the display screen in such a way that each such partition encloses a specific number of field line parts, said specific number of field line parts being equal throughout each partition and each of said specific number of field line parts having a specific number of pixels said specific number of pixels being the same on each of the field line parts throughout the entire display screen map;

(b) generating a field line part image data code by using primary colors of red, green and blue of the display screen raised to the power of the total number of pixels on a field line part of said computer display screen image map, so that the different or unique combinations of how the total number of pixels on a field line part of said computer display screen image map is exactly equal to base three raised to the power of the total number of pixels on the field line part;

(c) converting the base three raised to the total number of pixels on the field line part figure to base two or binary notation in order to obtain the total number of digits in base two that each of the base three raised to the power of the total number of pixels on the field line part unique combinations will contain said unique combinations now being noted in binary notation;

(d) storing all said unique combinations in binary notation that represent all possible arrangements of the total number of pixels on a field line part based on the three primary colors of red, green and blue, in a suitable storage medium where a microprocessor circuit means of a computer can have easy and fast access to them;

(e) using a computer shading or painting or image recreation tool such as a computer painting brush, a keyboard or a computer mouse to shade, paint or recreate an image, and storing the computer code generated as the computer shading, painting or image recreation tool does the painting, shading or recreation, said computer code being stored in a suitable storage medium such as an input register catering to the shading, painting or recreation tool inputs, said computer code being stored on a field line part code by field line part code basis;

(f) using a microprocessor of said computer to fetch a copy of the computer codes generated by the shading, painting or recreation tool from the storage medium on a field line part by field line part basis and matching them to said unique combinations in binary notation that represent all possible arrangements of the total number of pixels on the field line part of said computer display screen map, until all the computer codes of the shaded, painted or recreated image are matched;

(g) storing said matched field line part image data codes that now represent the painted, shaded or recreated image in a suitable computer data storage medium such as permanent memory for transmission to a computer terminal or for viewing on a display screen of said computer.

2. The method of claim 1 wherein said computer display screen map chosen can be made a variable parameter whereby only one of several such said computer display screen maps is chosen at a time depending on such factors as the size of the computer display screen being used to display the image and the length of the field line part image data code to be used, said length of the field line part image data code being described in terms of the standard total number of binary digits comprising such field line part image data code.

3. The method of claim 1 wherein the field line part image data codes generated provide an image data compression ratio of fifteen to one over non-compressed field line part image data codes of the same size of field line part comprising the same number of pixels with the same color composition or color arrangement.

4. The method of claim 1 wherein each field line part image data code generated by said hand-aided computer image altering tools such as said computer image painting or shading brush, said computer mouse or said computer keyboard and cursor is comparable or matchable to at least one of the field line part image data codes generated by the chosen computer display screen map or plan.

5. The method of claim 1 wherein the field line part image data code generated can also be based on two hundred and fifty six colors or base two raised to the power of eight total colors of the display screen used.

6. The method of claim 1 wherein the field line part image data code generated can also be based on sixteen million, seven hundred and seventy seven thousand, two hundred and sixteen total colors or base two raised to the power of twenty four total colors of the display screen used.

7. The method of claim 1 wherein the field line part image data code generated for successive images in a moving video sequence provides a maximum moving video compression ratio of two hundred and fifty six to one, said maximum moving video compression ratio being determined by allowing only one field line part image data code to differ from one successive image to the next within the moving video image sequence, with the rest of the field line part image data codes of all the images within the moving video sequence remaining exactly the same.

* * * * *